United States Patent
Ryu et al.

(10) Patent No.: US 11,509,009 B2
(45) Date of Patent: Nov. 22, 2022

(54) BATTERY MODULE WITH ENHANCED COOLING EFFICIENCY, AND BATTERY PACK COMPRISING SAME

(71) Applicant: LG Chem, Ltd., Seoul (KR)

(72) Inventors: Jae-Uk Ryu, Daejeon (KR); Min-Ho Kwon, Daejeon (KR); Dal-Mo Kang, Daejeon (KR); Jeong-O Mun, Daejeon (KR)

(73) Assignee: LG Energy Solution, Ltd.

( * ) Notice: Subject to any disclaimer, the term of this patent is extended or adjusted under 35 U.S.C. 154(b) by 56 days.

(21) Appl. No.: 16/979,402

(22) PCT Filed: Aug. 26, 2019

(86) PCT No.: PCT/KR2019/010868
§ 371 (c)(1),
(2) Date: Sep. 9, 2020

(87) PCT Pub. No.: WO2020/055004
PCT Pub. Date: Mar. 19, 2020

(65) Prior Publication Data
US 2021/0083342 A1    Mar. 18, 2021

(30) Foreign Application Priority Data

Sep. 11, 2018    (KR) .................. 10-2018-0108559

(51) Int. Cl.
*H01M 10/613* (2014.01)
*H01M 50/531* (2021.01)
*H01M 10/659* (2014.01)
*H01M 50/20* (2021.01)

(52) U.S. Cl.
CPC ....... *H01M 10/659* (2015.04); *H01M 10/613* (2015.04); *H01M 50/20* (2021.01); *H01M 50/531* (2021.01)

(58) Field of Classification Search
CPC ............. H01M 10/659; H01M 10/613; H01M 50/531; H01M 50/20
See application file for complete search history.

(56) References Cited

U.S. PATENT DOCUMENTS

| 9,212,745 B2 | 12/2015 | Kritzer |
| 2009/0305124 A1 | 12/2009 | Ahn et al. |

(Continued)

FOREIGN PATENT DOCUMENTS

| JP | 2012523085 A | 9/2012 |
| JP | 2018514052 A | 5/2018 |

(Continued)

OTHER PUBLICATIONS

KR20070025417MT (Year: 2007).*

(Continued)

*Primary Examiner* — Alexander Usyatinsky
(74) *Attorney, Agent, or Firm* — Lerner, David, Littenberg, Krumholz & Mentlik, LLP

(57) ABSTRACT

A battery module includes: a plurality of battery cells stacked to face each other; a plurality of cell cartridges stacked to surround the plurality of battery cells; and a plurality of PCM capsules disposed in the cell cartridges and each containing a phase change material (PCM) therein.

20 Claims, 6 Drawing Sheets

(56) References Cited

U.S. PATENT DOCUMENTS

| | | | |
|---|---|---|---|
| 2011/0070474 A1* | 3/2011 | Lee | H01M 50/209 |
| | | | 429/120 |
| 2011/0151301 A1 | 6/2011 | Kim | |
| 2013/0084487 A1 | 4/2013 | Kwak et al. | |
| 2016/0226042 A1* | 8/2016 | Hartmann | H01M 50/107 |
| 2017/0025720 A1* | 1/2017 | Kaiser | H01M 50/581 |
| 2019/0288351 A1 | 9/2019 | Son et al. | |

FOREIGN PATENT DOCUMENTS

| | | | |
|---|---|---|---|
| KR | 20070025417 | * | 3/2007 |
| KR | 20070025417 A | | 3/2007 |
| KR | 100905392 B1 | | 6/2009 |
| KR | 101058102 | | 8/2011 |
| KR | 20130035129 A | | 4/2013 |
| KR | 20140004830 A | | 1/2014 |
| KR | 20140024600 A | | 3/2014 |
| KR | 10214008067 | * | 7/2014 |
| KR | 20140086067 A | | 7/2014 |
| KR | 20160108987 A | | 9/2016 |
| KR | 20160144803 A | | 12/2016 |
| KR | 20170136067 A | | 12/2017 |
| KR | 20180023699 A | | 3/2018 |
| WO | 2018128306 A1 | | 7/2018 |

OTHER PUBLICATIONS

KR10214008067MT (Year: 2014).*
Extended European Search Report including Written Opinion for EP19859738.7 dated May 3, 2021; 7 pages.
International Search Report for Application No. PCT/KR2019/010868 dated Jan. 2, 2020, 2 pages.

* cited by examiner

BATTERY MODULE WITH ENHANCED COOLING EFFICIENCY, AND BATTERY PACK COMPRISING SAME

CROSS-REFERENCE TO RELATED APPLICATIONS

The present application is a national phase entry under 35 U.S.C. § 371 of International Application No. PCT/KR2019/010868 filed Aug. 26, 2019, which claims priority from Korean Patent Application No. 10-2018-0108559 filed on Sep. 11, 2018, the disclosures of which are incorporated herein by reference.

TECHNICAL FIELD

The present disclosure relates to a battery module with improved cooling efficiency and a battery pack including the battery module, and more particularly, to a battery module configured to improve the cooling efficiency by using a phase change material (PCM) capsule provided in a cell cartridge, and a battery pack including the battery module.

BACKGROUND ART

Secondary batteries commercially used at present include nickel-cadmium batteries, nickel-hydrogen batteries, nickel-zinc batteries, and lithium secondary batteries. Among them, the lithium secondary batteries are prominently used due to substantially no memory effect (to ensure free charging and discharging), very low self-discharge rate and high energy density, compared to nickel-based secondary batteries.

The lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate coated with a positive electrode active material and a negative electrode active material are disposed with a separator being interposed therebetween, and an exterior, namely a battery case, for hermetically accommodating the electrode assembly along with an electrolyte.

Generally, the lithium secondary battery may be classified into a can-type secondary battery in which the electrode assembly is included in a metal can and a pouch-type secondary battery in which the electrode assembly is included in a pouch made of aluminum laminate sheets, depending on the shape of the exterior.

Recently, secondary batteries have been widely used not only in small-sized devices such as portable electronic devices but also in medium-sized or large-sized devices such as vehicles and power storage systems. When used in the medium-sized or large-sized devices, a large number of secondary batteries are electrically connected to increase capacity and power. In particular, pouch-type cells are widely used for the medium-sized or large-sized devices because they may be easily stacked.

However, the pouch-type cell is generally packaged in a battery case made of a laminate sheet in which aluminum and resin are laminated, and thus its mechanical stiffness is not large. Thus, when the battery module including a plurality of pouch-type cells is configured, a frame is often used to protect the secondary batteries from external impact, prevent shaking thereof, and facilitate stacking thereof.

The frame may be called by different names, such as a cartridge. In many cases, the frame has a rectangular shape having an empty center portion, and at this time, four sides of the frame surround the outer circumference of the pouch-type cell. In addition, a plurality of frames are stacked to configure the battery module, and the pouch-type cells may be placed in the empty space inside the frame when the frames are stacked.

Meanwhile, referring to FIG. 1, a conventional battery module structure is shown. If a plurality of pouch-type cells 1 are stacked by using a plurality of frames 2, in the conventional battery module structure, plate-shaped cooling fins 3 are applied on the outer surfaces of each of the pair of pouch-type cells 1, thereby increasing the cooling efficiency.

The secondary battery may be used in high temperature environments such as summer, and the secondary battery may also generate heat from itself. At this time, if a plurality of secondary batteries are stacked on each other, the temperature of the secondary batteries may become higher. If the temperature is higher than a proper temperature, the performance of the secondary batteries may deteriorate, and in severe cases, explosion or ignition may occur. Thus, when the battery module is configured, the cooling fins 3 are applied to contact the surface of the pouch-type cell 1, and the cooling fins 3 are brought into contact with a cooling plate 4 located therebelow to prevent the overall temperature of the battery module from rising. This structure is used frequently.

However, if the cooling fin 3 usually made of a metal material is interposed between the pouch-type cells 1 facing each other to configure the battery module, the process of stacking/fixing the pouch-type cells 1 and the cooling fin 3 takes a lot of time, resulting in deteriorated productivity. Also, it is difficult to obtain sufficient cooling effect only with the cooling fin 3.

In addition, if a cooling fin 3 is interposed between each one of the facing pouch-type cells 1, the volume of the battery module inevitably increases due to the thickness of the cooling fin 3, thereby causing loss in terms of energy density.

Thus, there is an urgent need to develop a battery module structure that solves the above process problem and has excellent cooling effect without causing loss in terms of energy density.

DISCLOSURE

Technical Problem

The present disclosure is designed to solve the problems of the related art, and therefore the present disclosure is directed to improving the cooling efficiency and preventing loss in terms of energy density by applying a PCM capsule capable of improving the cooling efficiency in a cell cartridge without using a cooling member like a cooling fin that increases the volume of the battery module.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a plurality of battery cells stacked to face each other; a plurality of cell cartridges stacked to surround the plurality of battery cells; and a plurality of PCM capsules disposed in the cell cartridges and containing a phase change material (PCM) therein.

The battery cell may include: an electrode assembly; a cell case having an accommodation portion for accommodating the electrode assembly and a sealing portion extending outward from a periphery of the accommodation portion; and an electrode lead connected to the electrode assembly and drawn out through the sealing portion of the cell case.

The cell cartridge may include: a main frame in the form of a rectangular rim; and a sub frame extending from an inner side surface of the main frame and being in the form of a rectangular rim smaller than the main frame.

The main frame may be sized and shaped corresponding to the battery cell to accommodate the battery cell.

The sub frame may be sized and shaped corresponding to the accommodation portion to accommodate the accommodation portion.

An upper surface of the sealing portion may be placed on a lower surface of the sub frame provided to the cell cartridge coupled from an upper portion of the battery cell, and a lower surface of the sealing portion may be placed on an upper surface of the sub frame provided to the cell cartridge coupled from a lower portion of the battery cell.

The PCM capsule may be inserted through an outer side surface and an inner side surface of the cell cartridge.

The PCM capsule may have one end contacting the battery cell and the other end exposed out of the battery module.

The PCM capsule may include: a PCM; and a capsule sheath configured to accommodate the PCM.

The PCM capsule may be insert-injected along with a resin, which forms the cell cartridge, and be located inside the cell cartridge.

The capsule sheath may have a higher melting point than the resin that forms the cell cartridge.

Meanwhile, a battery pack according to an embodiment of the present disclosure may comprise a plurality of battery modules according to an embodiment of the present disclosure.

Advantageous Effects

According to one aspect of the present disclosure, it is possible to improve the cooling efficiency and prevent loss in terms of energy density by applying a PCM capsule capable of improving the cooling efficiency in a cell cartridge without using a cooling member like a cooling fin that increases the volume of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but rather interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustration only, not intended to limit the scope of the disclosure, so it should be understood that other equivalents and modifications could be made thereto without departing from the scope of the disclosure.

First, a schematic structure of a battery module according to an embodiment of the present disclosure will be described with reference to FIG. 2.

Figure 1:
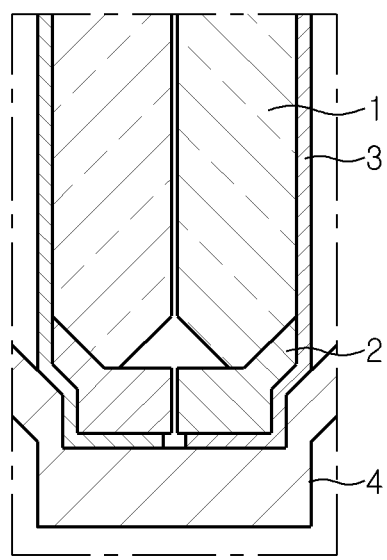
FIG. 1 is a cross-sectional diagram showing a conventional battery module to which a cooling fin is applied.
Figure 2:
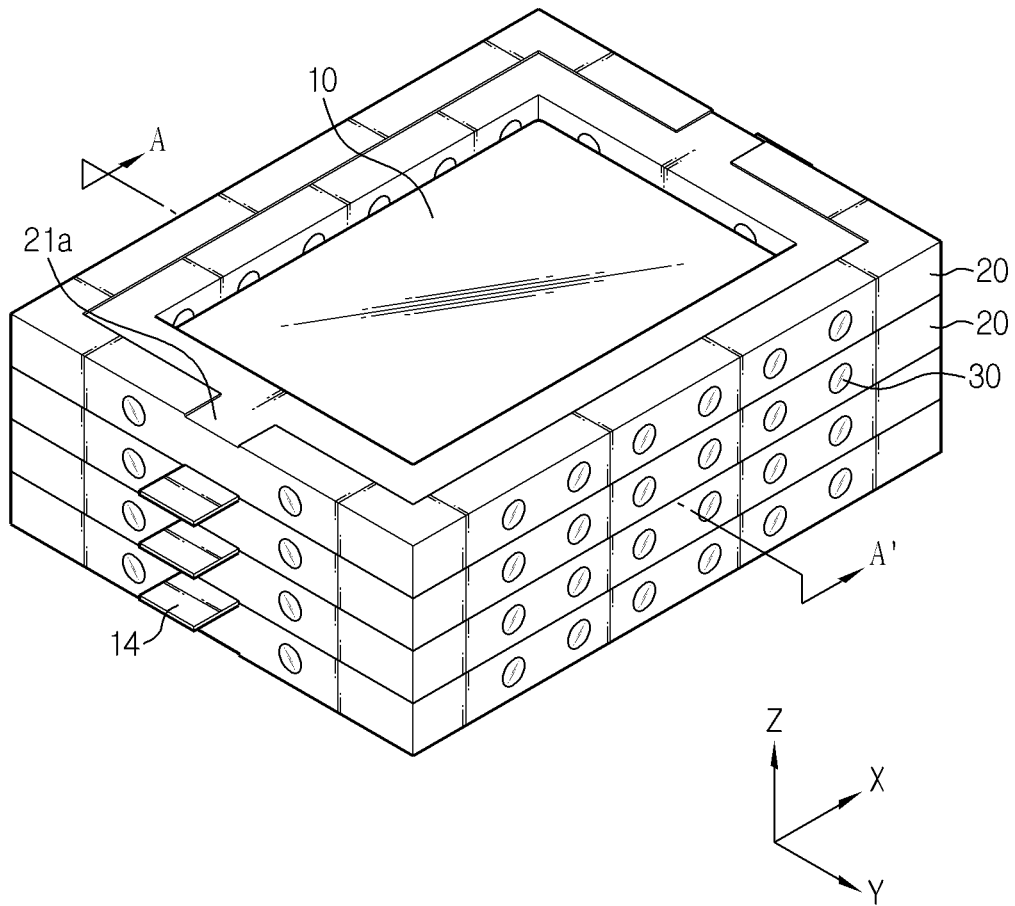
FIG. 2 is a perspective view showing a battery module according to an embodiment of the present disclosure.

FIG. 2 is a perspective view showing a battery module according to an embodiment of the present disclosure.

Referring to FIG. 2, the battery module according to an embodiment of the present disclosure includes a plurality of battery cells 10, a plurality of cell cartridges 20 and a plurality of PCM capsules 30.

The battery cell 10 may be, for example, a pouch-type battery cell. Each battery cell 10 is fixed by a pair of cell cartridges 20 respectively disposed at an upper portion and a lower portion thereof.

The cell cartridge 20 has a substantially rectangular rim shape and accommodates the battery cell 10 in a space formed inside the rim. The cell cartridge 20 is provided in a pair, and the pair of cell cartridge are disposed at the upper portion and the lower portion of one battery cell 10, respectively, thereby fixing the battery cell 10 at the upper and lower portions.

The PCM capsule 30 is disposed through the cell cartridge 20. One end of the PCM capsule 30 may be in contact with the battery cell 10 through a hole formed in the cell cartridge 20, and the other end of the PCM capsule 30 may be exposed out of the battery module. The PCM capsule 30 contains a phase change material (PCM) therein, as explained later, and takes heat generated from the battery cell 10 by means of phase change of the PCM and releases the heat to the outside.

Next, the battery cell 10 applied to the present disclosure will be described in detail with reference to FIG. 3.

Figure 3:
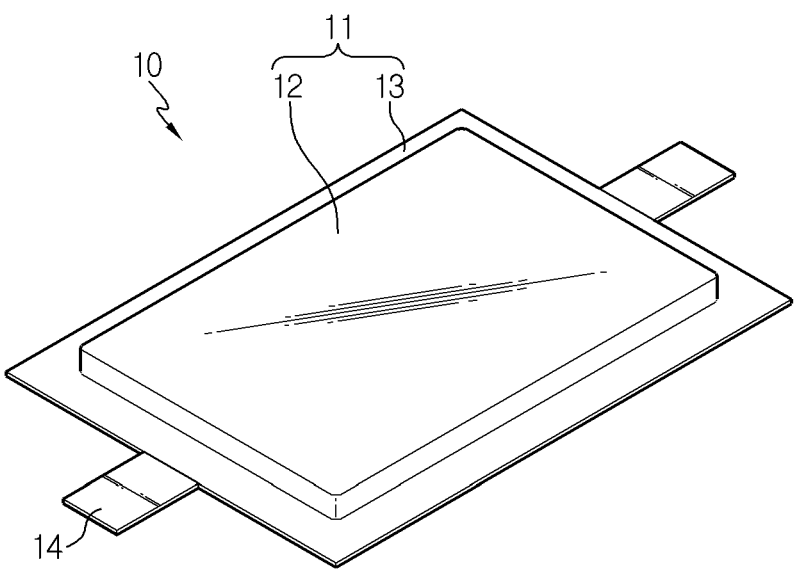
FIG. 3 is a perspective view showing a battery cell applied to the battery module according to an embodiment of the present disclosure.

FIG. 3 is a perspective view showing a battery cell applied to the battery module according to an embodiment of the present disclosure.

Referring to FIG. 3, the battery cell 10 includes an electrode assembly (not shown), a cell case 11 and an electrode lead 14. This embodiment will be described based on the case where the battery cell 10 is a pouch-type battery cell.

Although not shown in the figures, the electrode assembly may be in the form of a stack where a positive electrode, a negative electrode and a separator interposed therebetween are stacked in order at least one time, or in the form where the stack is wound.

The positive electrode includes a positive electrode current collector and a positive electrode active material layer coated on at least one surface of the positive electrode current collector. The negative electrode includes a negative electrode current collector and a negative electrode active material layer coated on at least one surface of the negative electrode current collector. The separator may be made of a porous material so that positive and negative ions may move between the positive electrode and the negative electrode through the separator.

The cell case 11 is made of a pouch film in which a resin layer, a metal layer and a resin layer are stacked in order. The cell case 11 includes an accommodation portion 12 for accommodating the electrode assembly and a sealing portion 13 extending outward from a periphery of the accommodation portion 12. Before the sealing portion 13 is formed by thermal fusion, an electrolyte is injected into the cell case 11 together with the electrode assembly.

The electrode lead 14 is connected to an electrode tab (not shown) formed at the electrode assembly and is drawn out of the cell case 11 through the sealing portion 13. The electrode lead 14 is provided in a pair, one of which corresponds to a positive electrode lead connected to a positive electrode tab and the other of which corresponds to a negative electrode lead connected to a negative electrode tab.

In the present disclosure, only a case where a pair of electrode leads 14 are drawn in opposite directions is depicted, but this is an exemplary form of the battery cell 10. Alternatively, the pair of electrode leads 14 may be drawn in the same direction.

Next, the cell cartridge 20 applied to the present disclosure will be described in detail with reference to FIGS. 4 to 6 along with FIG. 2.

Figure 4:
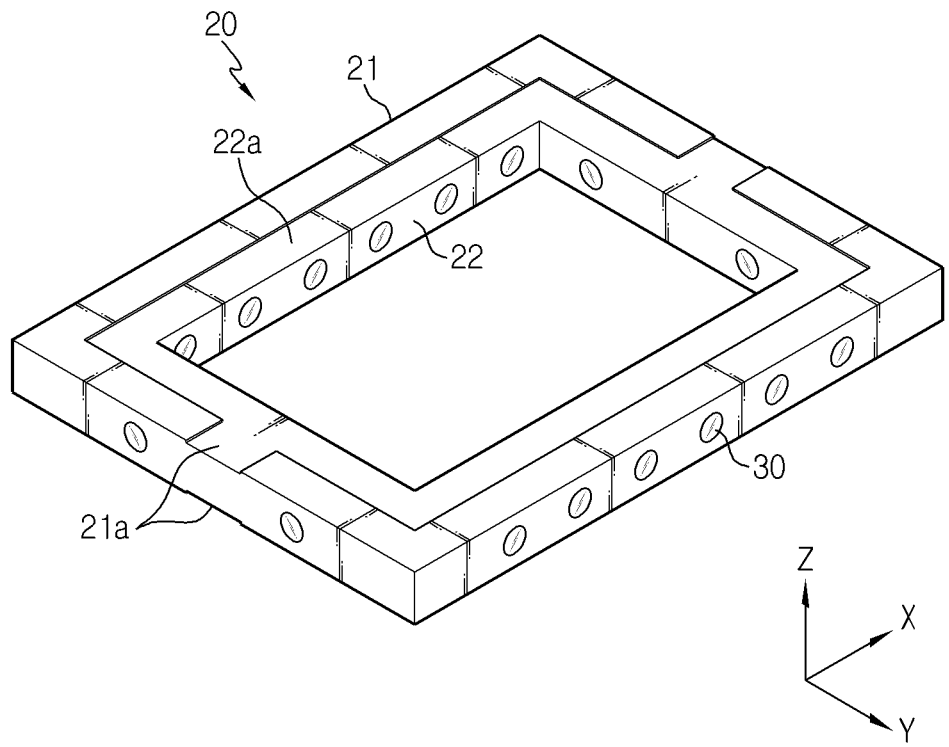
FIGS. 4 and 5 are perspective views showing a cell cartridge applied to the battery module according to an embodiment of the present disclosure.
Figure 5:
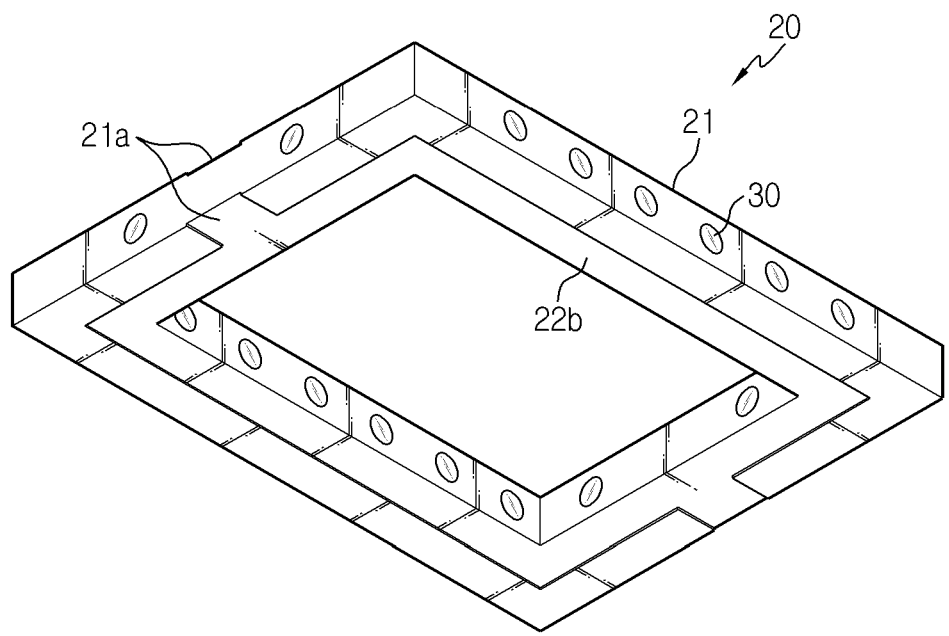

FIGS. 4 and 5 are perspective views showing a cell cartridge applied to the battery module according to an embodiment of the present disclosure. Also, FIG. 6 is a cross-sectional view, taken along the line A-A' of FIG. 2.

Figure 6:
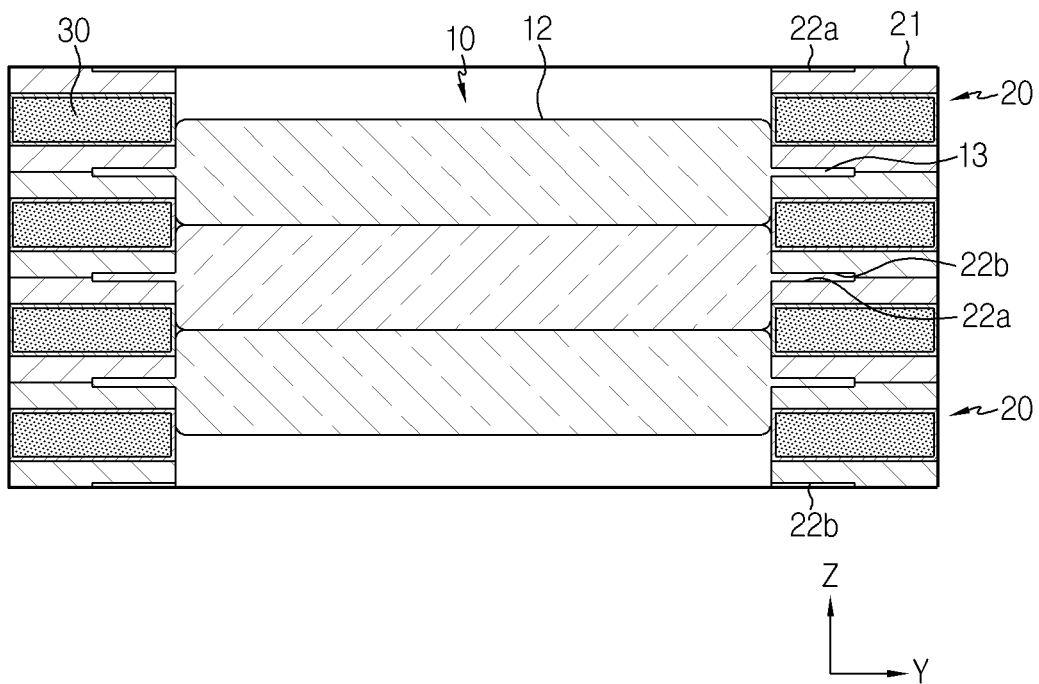
FIG. 6 is a cross-sectional view, taken along the line A-A' of FIG. 2.

Referring to FIGS. 4 to 6 along with FIG. 2, the cell cartridge 20 includes a main frame 21, in the form of a substantially rectangular rim, and a sub frame 22 extending toward the inside of the rim from an inner side surface of the main frame 21.

The main frame 21 is sized and shaped corresponding to the battery cell 10 to accommodate the battery cell 10. The main frame 21 has a lead drawing groove 21a which allows the electrode lead 14 of the battery cell 10 accommodated in the rim to be drawn out of the main frame 21.

The lead drawing groove 21a is formed at an upper surface and a lower surface of the main frame 21, respectively. Accordingly, when a pair of cell cartridges 20 are stacked in a matched form, the lead drawing grooves 21a formed at the lower surface of the upper cell cartridge 20 and the lead drawing groove 21a formed at the upper surface of the lower cell cartridge 20 are engaged to form one slit through which the electrode lead 14 may be drawn out.

The sub frame 22 is sized and shaped corresponding to the accommodation portion 13 to accommodate the accommodation portion 13 of the battery cell 10. That is, the sub frame 22 is in the form a rectangular rim smaller than the main frame 21 described above.

The sealing portions 13 of the battery cell 10 are placed on the upper surface 22a and the lower surface 22b of respective sub frames 22. That is, the sealing portion 13 of the battery cell 10 disposed at the upper portion of the lower cell cartridge 20 is placed on the upper surface 22a of the sub frame 22 of the lower cell cartridge 20, and the sealing portion 13 of the battery cell 10 disposed at the lower portion of the upper cell cartridge 20 is placed on the lower surface 22b of the sub frame 22 of the upper cell cartridge 20.

Thus, when the pair of cell cartridges 20 are stacked in a matched form, the sealing portion 13 of the battery cell 10 accommodated therebetween is fixed between the lower surface 22b of the sub frame 22 provided at the cell cartridge 20 located at the upper portion of the battery cell 10 and the upper surface 22a of the sub frame 22 provided at the cell cartridge 20 located at the lower portion of the battery cell 10.

The cell cartridge 20 may be made of a material such as plastic, silicon, urethane, or the like. Next, referring to FIG. 7 along with FIGS. 2 and 6, the PCM capsule 30 applied to the present disclosure will be described in detail.

Figure 7:
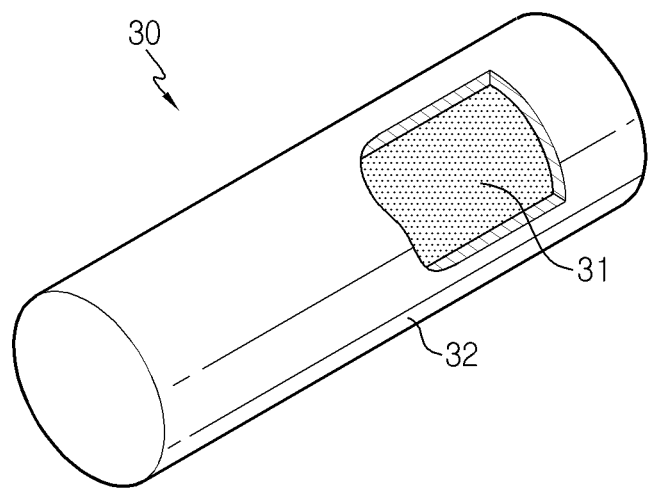
FIG. 7 is a perspective, partially cutaway view showing a PCM capsule applied to the battery module according to an embodiment of the present disclosure.

FIG. 7 is a perspective, partially cutaway view showing a PCM capsule applied to the battery module according to an embodiment of the present disclosure.

Referring to FIG. 7 along with FIGS. 2 and 6, the PCM capsule 30 may have an approximately long cylindrical shape and is inserted through the outer side surface and the inner side surface of the cell cartridge 20. The PCM capsule 30 includes a PCM 31 and a capsule sheath 32 corresponding to a sheath accommodating the PCM 31.

Since the PCM capsule 30 is formed through the cell cartridge 20, one end thereof may directly contact the battery cell 10 accommodated in the cell cartridge 20. Thus, the PCM capsule 30 may rapidly react with the heat generated from the battery cell 10 to cause a phase change and may rapidly remove the heat generated from the battery cell 10 through the phase change, thereby lowering the temperature of the battery cell 10 to an appropriate level.

In addition, since the other end of the PCM capsule 30 is exposed to the outside through the hole formed through the cell cartridge 20, the heat taken from the battery cell 10 may be quickly released to the outside. During the heat releasing process, the PCM capsule 30 may cause a phase change from a liquid state to a solid state or from a gas state to a liquid state.

The PCM 31 may employ, for example, a material that changes from a solid state to a liquid state or from a liquid state to a gas state by absorbing heat when the battery cell 10 generates heat causing the ambient temperature to rise above a certain level, and also change from a liquid state to a solid state or from a gas state to a liquid state while releasing the absorbed heat to the outside.

The PCM 31 may use, for example, any one selected from the group consisting of inorganic substances in the form of hydrates, paraffinic hydrocarbons and organic acids, or a mixture thereof.

The inorganic substances in the form of hydrates may include, for example, any one selected from the group consisting of $NaNH_4SO_4 \cdot 2H_2O$, $Na_2SO_4 \cdot 10H_2O$, $Na_2SiO_3 \cdot 5H_2O$, $Na_3PO_4 \cdot 12H_2O$, $Na\ (CH_3COO) \cdot 3H_2O$, $NaHPO_4 \cdot 12H_2O$, $K_2HPO_4 \cdot 3H_2O$, $Fe\ (NO_3)_3 \cdot 9H_2O$, $FeCl_3 \cdot 2H_2O$, $Fe_2O_3 \cdot 4SO_4 \cdot 9H_2O$, $Ca\ (NO_3)_2 \cdot 3H_2O$, $CaCl_2 \cdot 6H_2O$, $K_2HPO_4 \cdot 3H_2O$ and $K_3PO_4 \cdot 7H_2O$, or a mixture thereof.

The paraffinic hydrocarbons may include any one selected from the group consisting of n-octacosane, n-heptacosane, n-pentacosane, n-tetracosane, n-tricosane, n-docosane, n-heneicosane, n-eicosane, n-nonadecane, n-octadecane, n-heptadecane, n-hexadecane, n-pentadecane, n-tetradecane and n-tridecane, or a mixture thereof.

In addition, the organic acids may include any one selected from the group consisting of n-octanoic acid, tartaric acid, oxalic acid, acetic acid, lactic acid and chloroacetic acid, or a mixture thereof.

The capsule sheath 32 is a container for accommodating the PCM 31. The capsule sheath 32 may have any thickness capable of facilitating the heat transfer between the outside and the inside of the capsule sheath 32 so that the PCM 31 therein may easily cause a phase change according to a temperature change, without limitation.

Meanwhile, the capsule sheath 32 may employ various kinds of resins and may include, for example, any one selected from the group consisting of polyethylene, polypropylene, polystyrene, nylon, polycaprolactone, polyethylene terephthalate, polyurethane, gelatin, chitosan, cellulose, polymethyl metaacrylate and derivatives thereof, or a mixture thereof.

As described above, according to the present disclosure, the heat generated from the battery cell 10 is absorbed by the PCM 31 inside the PCM capsule 30, thereby improving cooling performance through temperature management. In addition, by adjusting the amount of the PCM capsule 30, it is possible to exclude the application of a cooling member such as a conventional cooling fin, thereby implementing a battery module of a so-called "uncooled structure".

Next, a battery module according to another embodiment of the present disclosure will be described with reference to FIGS. 8 to 10.

Figure 8:
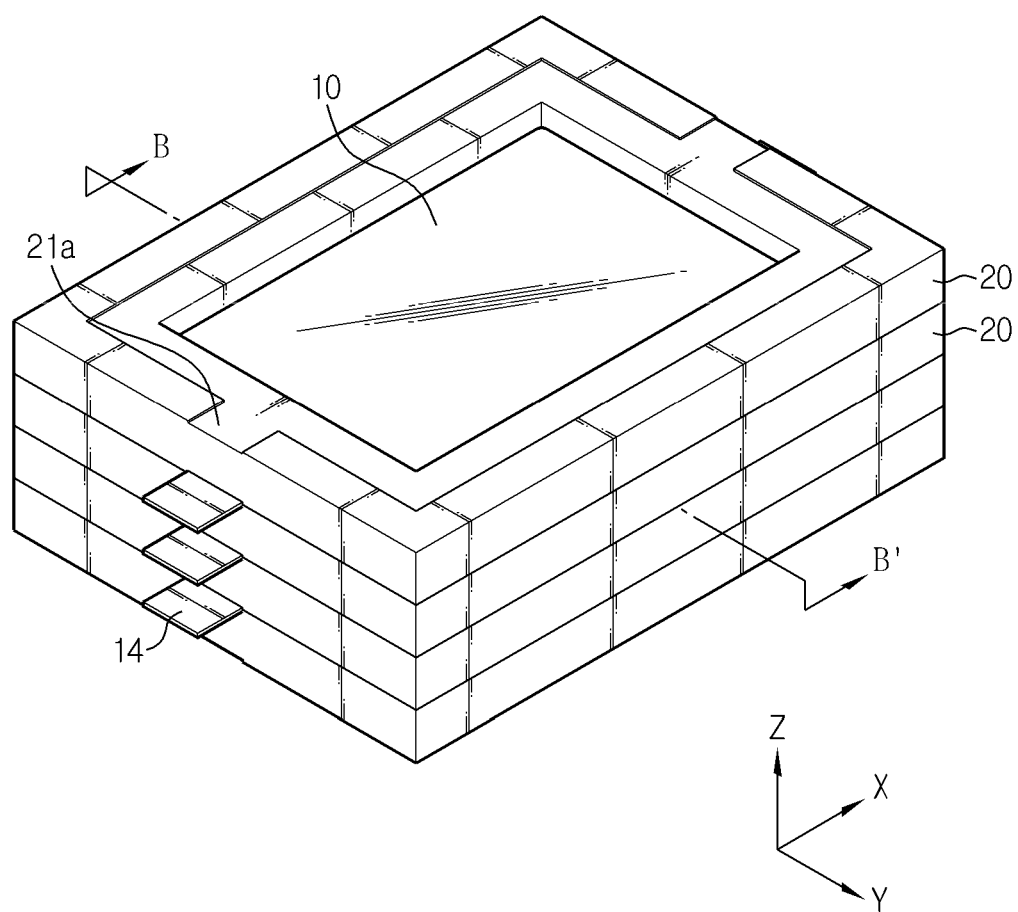
FIG. 8 is a perspective view showing a battery module according to another embodiment of the present disclosure.
Figure 9:
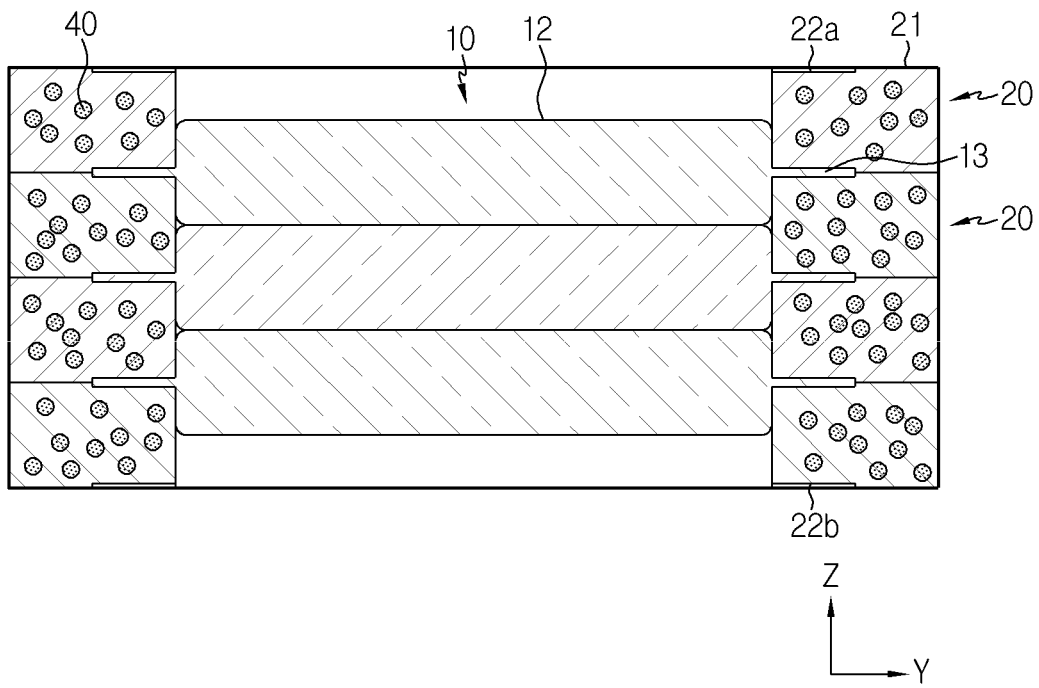
FIG. 9 is a cross-sectional view, taken along the line B-B' of FIG. 8.
Figure 10:
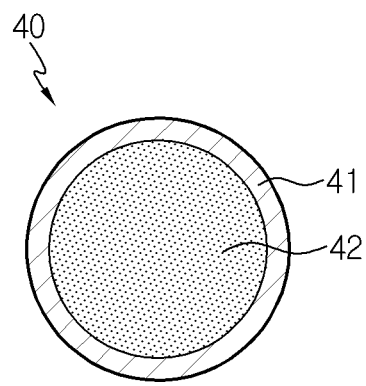
FIG. 10 is a cross-sectional view showing a PCM capsule applied to the battery module according to another embodiment of the present disclosure.

FIG. 8 is a perspective view showing a battery module according to another embodiment of the present disclosure, FIG. 9 is a cross-sectional view, taken along the line B-B' of FIG. 8, and FIG. 10 is a cross-sectional view showing a PCM capsule applied to the battery module according to another embodiment of the present disclosure.

Referring to FIGS. 8 to 10, the battery module according to another embodiment of the present disclosure is different from the battery module of the former embodiment of the present disclosure only in the form where the PCM capsule 40 is applied, and other components are substantially the same. Thus, in describing the battery module according to another embodiment of the present disclosure, the following description will focus on the parts that differ from the battery module of the former embodiment, and duplicate description for the remaining components substantially not different from the former embodiment will be omitted.

In the battery module according to another embodiment of the present disclosure, the PCM capsule 40 is embedded in the cell cartridge 20 by, for example, insert-injection or the like. That is, when a resin melt such as plastic is put into a mold and injected into the form of the cell cartridge 20 of the present disclosure, the PCM capsule 40 may be mixed in the resin melt and thus insert-injected together. By doing so, the plurality of PCM capsules 40 may be evenly embedded through the cell cartridge 20.

If the PCM capsules 40 are located inside the cell cartridge 20 as above, the heat may be absorbed and released evenly and rapidly across the entire area of the cell cartridge 20.

Meanwhile, in order to fabricate the embodiment in which the PCM capsules 40 are embedded in the cell cartridge 20 by insert-injection, a melting point of the capsule sheath 41 of the PCM capsule 40 is preferably higher than a melting point of the resin forming the cell cartridge 20. This is to prevent the capsule sheath 41 from being melted and thus the PCM 42 inside the capsule sheath 41 from flowing out of the capsule sheath 41, when making a resin melt to perform the injection using a resin.

In addition, even when the cell cartridge 20 is made of silicon or urethane, the PCM capsules 40 may be prepared so as not to deform or cause abnormal performance when being mixed with silicon and urethane. In this case, the PCM capsules 40 may be applied to various shapes of products.

Meanwhile, unlike the PCM capsule 30 applied in the former embodiment, the PCM capsule 40 may have a substantially spherical shape with a circular cross section. However, the shape of the PCM capsule 40 is not limited thereto. That is, the outer shape of the PCM capsule 40 is not particularly limited as long as it may be filled with high density into the cell cartridge 20.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
    a plurality of battery cells stacked alongside each other along a stacking axis;
    a plurality of cell cartridges stacked along the stacking axis, each of the cell cartridges defined by a perimeter frame encircling an open interior region, the cell cartridges being stacked so as to surround the plurality of battery cells about the stacking axis with each one of the battery cells being received in the open interior region of a respective one of the cell cartridges; and
    a plurality of PCM capsules disposed in the perimeter frame of the cell cartridges, each of the PCM capsules containing a phase change material (PCM) therein.

2. The battery module according to claim 1, wherein each of the battery cells includes:
    an electrode assembly;
    a cell case having an accommodation portion for accommodating the electrode assembly and a sealing portion extending outwardly from a periphery of the accommodation portion; and
    an electrode lead connected to the electrode assembly and extending outwardly through the sealing portion of the cell case.

3. The battery module according to claim 2, wherein the perimeter frame of each of the cell cartridges includes:
    a main frame in the form of a rectangular rim encircling the open interior region; and
    a sub frame extending inwardly from an inside surface of the main frame facing the interior region and being in the form of a second rectangular rim smaller than the main frame and defining a second open interior region therein.

4. The battery module according to claim 3,
    wherein the sub frame is sized and shaped to receive the accommodation portion of the cell case of the respective one of the battery cells in the second open interior region.

5. The battery module according to claim 4,
    wherein the respective one of the battery cells is secured between a pair of the plurality of cell cartridges, with a first one of the pair of cell cartridges being disposed at an upper portion of the respective one of the battery cells and a second one of the pair of cell cartridges being disposed at a lower portion of the respective one of the battery cells.

6. The battery module according to claim 4,
wherein an upper surface of the sealing portion of the respective one of the battery cells is positioned on a lower surface of the sub frame of an upper one of the cell cartridges coupled to an upper portion of the respective one of the battery cells, and
wherein a lower surface of the sealing portion of the respective one of the battery cells is positioned on an upper surface of the sub frame of a lower one of the cell cartridges coupled to a lower portion of the respective one of the battery cells.

7. The battery module according to claim 1,
wherein each of the PCM capsules extends through both an outer side surface and an inner side surface of an associated one of the cell cartridges.

8. The battery module according to claim 7,
wherein each of the PCM capsules has a first end contacting an adjacent one of the battery cells and a second end exposed outside of the battery module.

9. The battery module according to claim 7,
wherein each of the PCM capsules has a cylindrical shape.

10. The battery module according to claim 1, wherein each of the PCM capsules includes:
a capsule sheath configured to accommodate the phase change material (PCM) therein.

11. The battery module according to claim 10,
wherein each of the PCM capsules is located inside an associated one of the cell cartridges, each PCM capsule being insert-injected along with a resin to form the associated one of the cell cartridges.

12. The battery module according to claim 11,
wherein the capsule sheath of each of the PCM capsules has a higher melting point than the resin that forms the associated cell cartridge.

13. The battery module according to claim 11,
wherein each of the PCM capsules has a spherical shape.

14. A battery pack, comprising a plurality of battery modules according to claim 1.

15. A battery module, comprising:
a plurality of battery cells stacked alongside each other;
a plurality of cell cartridges stacked so as to surround the plurality of battery cells; and
a plurality of PCM capsules disposed in the cell cartridges, each of the PCM capsules containing a phase change material (PCM) therein,
wherein each of the battery cells includes:
an electrode assembly;
a cell case having an accommodation portion for accommodating the electrode assembly and a sealing portion extending outwardly from a periphery of the accommodation portion; and
an electrode lead connected to the electrode assembly and extending outwardly through the sealing portion of the cell case, and
wherein each of the cell cartridges includes:
a main frame in the form of a rectangular rim encircling an open interior region; and
a sub frame extending inwardly from an inside surface of the main frame facing the interior region and being in the form of a second rectangular rim smaller than the main frame and defining a second open interior region therein.

16. The battery module according to claim 15,
wherein each of the main frames is sized and shaped to accommodate a respective one of the battery cells in the open interior region.

17. The battery module according to claim 16,
wherein the sub frame is sized and shaped to receive the accommodation portion of the cell case of the respective one of the battery cells in the second open interior region.

18. The battery module according to claim 17,
wherein an upper surface of the sealing portion of the respective one of the battery cells is positioned on a lower surface of the sub frame of an upper one of the cell cartridges coupled to an upper portion of the respective one of the battery cells, and
wherein a lower surface of the sealing portion of the respective one of the battery cells is positioned on an upper surface of the sub frame of a lower one of the cell cartridges coupled to a lower portion of the respective one of the battery cells.

19. The battery module according to claim 15,
wherein each of the PCM capsules extends through both an outer side surface and an inner side surface of an associated one of the cell cartridges.

20. The battery module according to claim 19,
wherein each of the PCM capsules has a cylindrical shape.

* * * * *